United States Patent [19]

Hsu

[11] Patent Number: 5,900,950
[45] Date of Patent: May 4, 1999

[54] IMAGE SCANNER WITH A FUNCTION OF INITIATING SCANNING AUTOMATICALLY

[75] Inventor: Adolf T. R. Hsu, Hsin-Chu, Taiwan

[73] Assignee: Mustek System Inc., Hsin-chu, Taiwan

[21] Appl. No.: 08/914,175

[22] Filed: Aug. 19, 1997

[51] Int. Cl.$^6$ .................................................. H04N 1/04
[52] U.S. Cl. .......................... 358/497; 358/475; 358/474
[58] Field of Search .................................. 358/497, 494,
358/474, 471, 488, 461, 464, 400, 401,
296, 498, 475, 487, 505, 506, 513, 514,
496; 250/208.1; 355/75; 399/9, 32, 206

[56] References Cited

U.S. PATENT DOCUMENTS

| | | | |
|---|---|---|---|
| 4,749,872 | 6/1988 | Asada et al. ................................ | 355/75 |
| 5,541,713 | 7/1996 | Takatsuki et al. ....................... | 399/206 |
| 5,673,126 | 9/1997 | Ando ........................................ | 358/498 |
| 5,682,252 | 10/1997 | Ando ........................................ | 358/461 |
| 5,778,276 | 7/1998 | Hasegawa ................................. | 355/75 |

*Primary Examiner*—Edward L. Coles
*Assistant Examiner*—Cheukfan Lee
*Attorney, Agent, or Firm*—McDermott, Will & Emery

[57] ABSTRACT

This relates to an image scanner with a function of initiating scanning automatically. In addition to the main light source, an independent light source is provided in an image scanner for supplying a specific light signal, and a corresponding sensing window is also provided for detecting the open/close status of the top cover by means of the existing CCD/CIS in the image scanner, and decide the scanning of the document automatically or not accordingly. The independent light source being provided can be lighted on continually or be flickering for cooperating with the sensing window for detecting the open/close status of the top cover.

6 Claims, 6 Drawing Sheets

IMAGE SCANNER WITH A FUNCTION OF INITIATING SCANNING AUTOMATICALLY

FIELD OF THE INVENTION

The present invention relates to an image scanner with a function of initiating scanning automatically, and more particularly to an image scanner which is provided with an independent light source in addition to the main light source for supplying a specific light signal for detecting the open/close status of the top cover, therefore the image scanner can be initiated correctly for scanning automatically.

BACKGROUND OF THE INVENTION

Conventional image scanner generally employs keystroke or software programming for initiating scanning, without any function for initiating scanning automatically, thus the operation of the image scanner is rather tedious. Some image scanners have been designed for initiating scanning automatically, but the devices used, such as microswitch, photointerrupter, photoresistor, phototransistor, are expensive and are hard to achieve reliability, thus increasing the cost of the image scanner, making the manufacturing process more complicated, and lowering the reliability.

OBJECTS OF THE INVENTION

It is therefore an object of the present invention to provide an independent light source in an image scanner in addition to the main light source for supplying a specific light signal, and provide a corresponding sensing window for detecting the open/close status of the top cover by means of the existing CCD/CIS (Charged Coupled Device/Contact Image Sensor) in the image scanner, and decide the scanning of the document automatically or not accordingly.

It is another object of the present invention that the independent light source being provided can be lighted on continually or be flickering for detecting the open/close status of the top cover.

It as a further object of the present invention to use some low price devices, such as LED(Light Emitting Diode), as the independent light source, and being assembled on the optical carriage of the image scanner, so as to simply the assembly, lower the cost, and increase the reliability.

BRIEF DESCRIPTION OF THE DRAWINGS

The present invention can be better understood by detailed descriptions of the following drawings, in which.

DETAILED DESCRIPTION OF THE INVENTION

Figure 1:
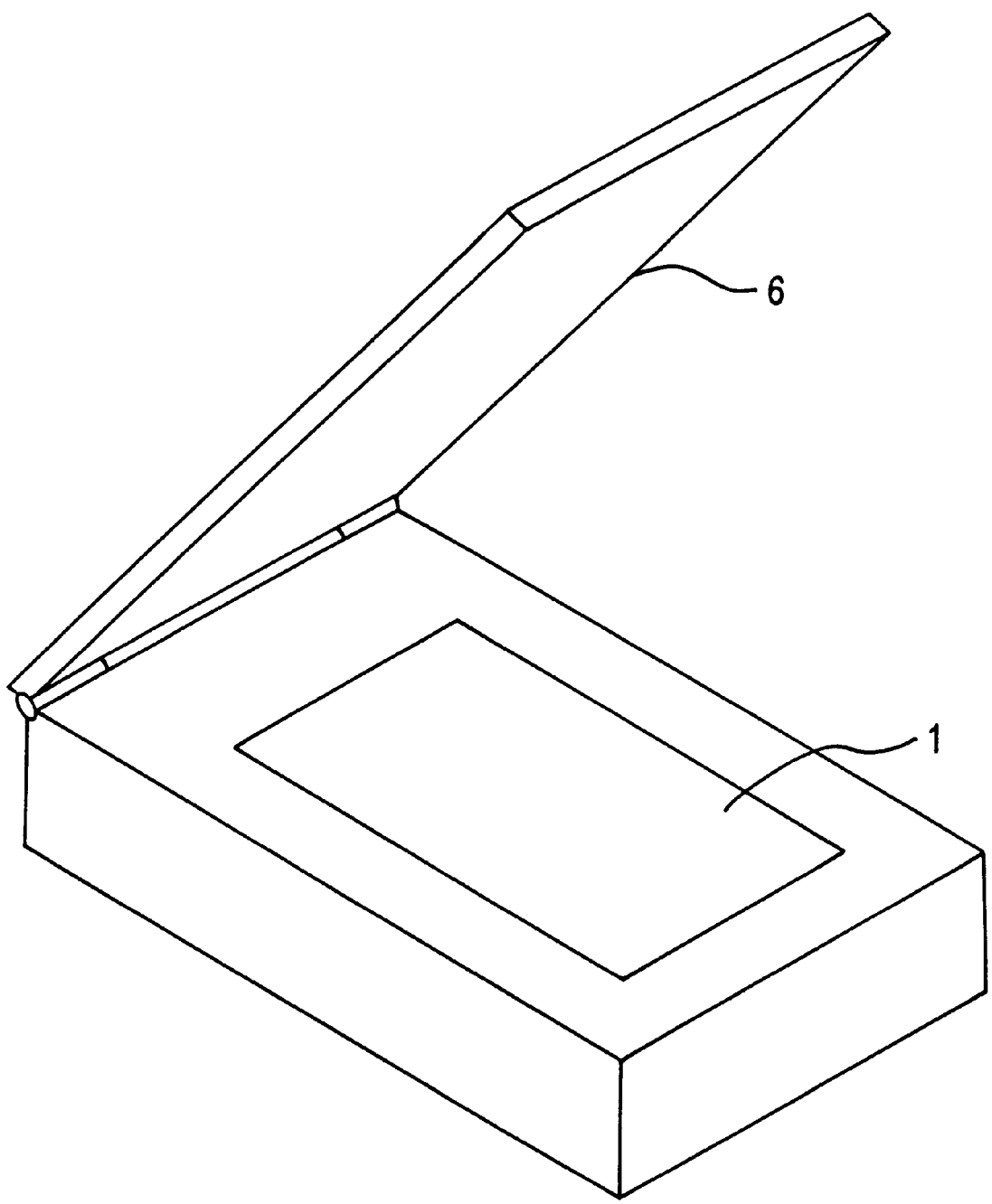
FIG. 1 is a simplified perspective view of a conventional flat bed image scanner.
Figure 2:
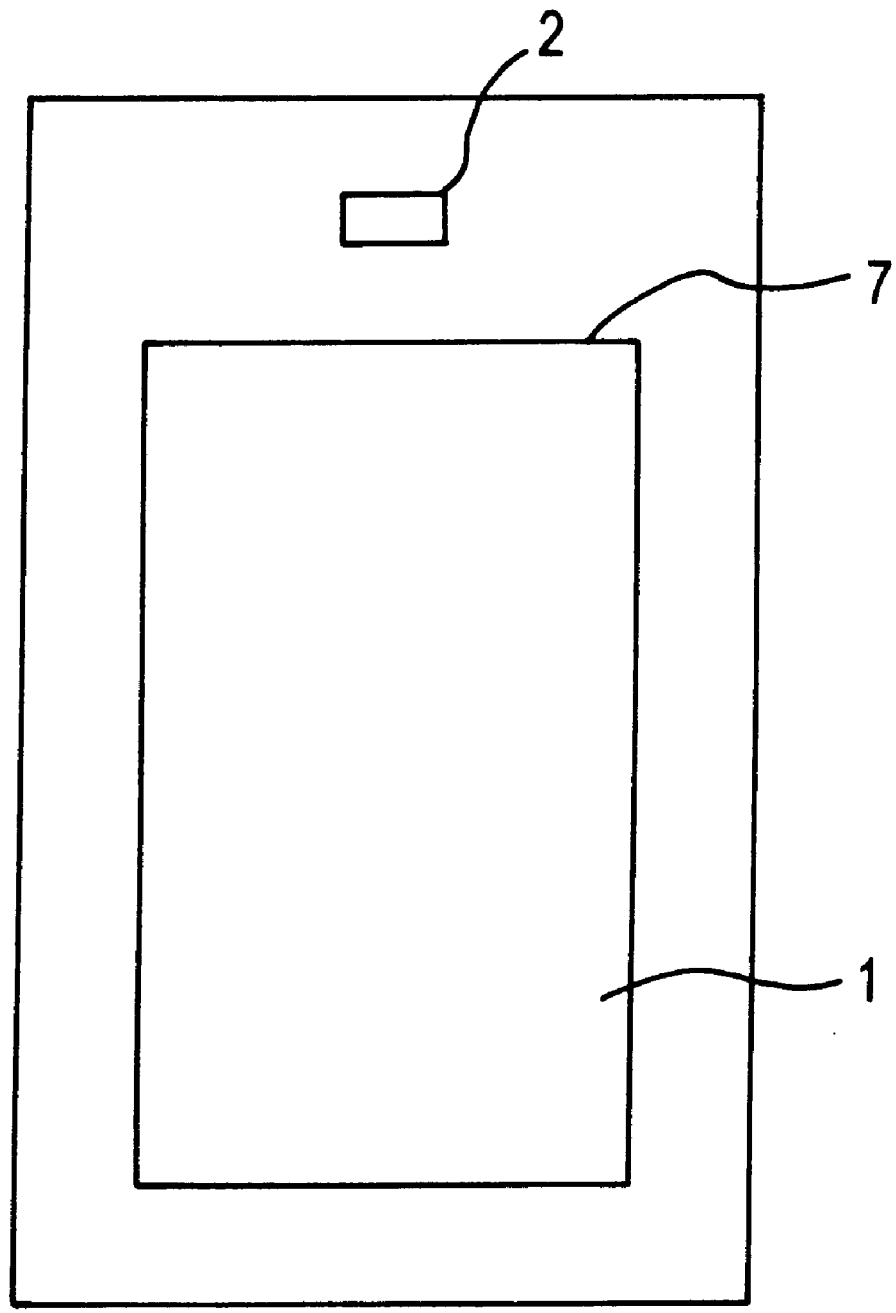
FIG. 2 is a schematic view of the document window of a flat bed image scanner according to the present invention.
Figure 3:
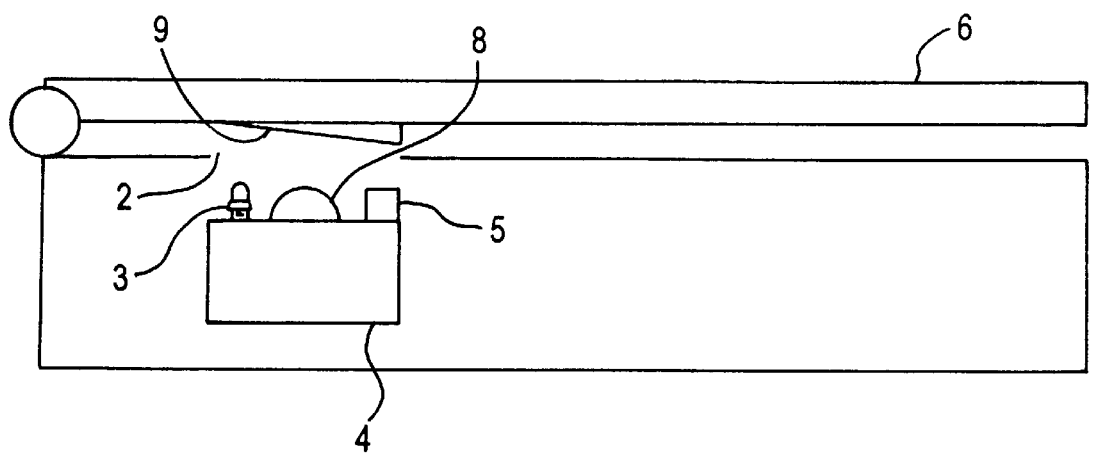
FIG. 3 is a side sectional view of the image scanner according to the present invention.

Please refer to FIG. 1 and 2, FIG. 1 is a simplified perspective view of a conventional flat bed image scanner, FIG. 2 is a schematic view of the document window of a flat bed image scanner according to the present invention. A small aperture 2 is provided in front of the start position 7 of the document window 1, which is referred as a sensing window hereinafter. An independent light source 3 (e.g. LED) in addition to a main light source 8 is provided on the optical carriage 4 below the sensing window 2, as shown in FIG. 3. The CCD/CIS 5 on optical cage 4 can detect the pattern 9 (a little slanted for reflecting light) of the corresponding portion on top cover 6 by means of the reflected light of the independent light source 3 via the sensing window 2. When the top cover 6 is closed, since the specific pattern 9 of the corresponding portion on top cover 6 can be detected, the image scanner therefore can judge that the top cover 6 as closed. When the top cover is opened, since the specific pattern 9 of the corresponding portion on top cover 6 can not be detected, the image scanner therefore can judge that the top cover is opened.

Figure 4:
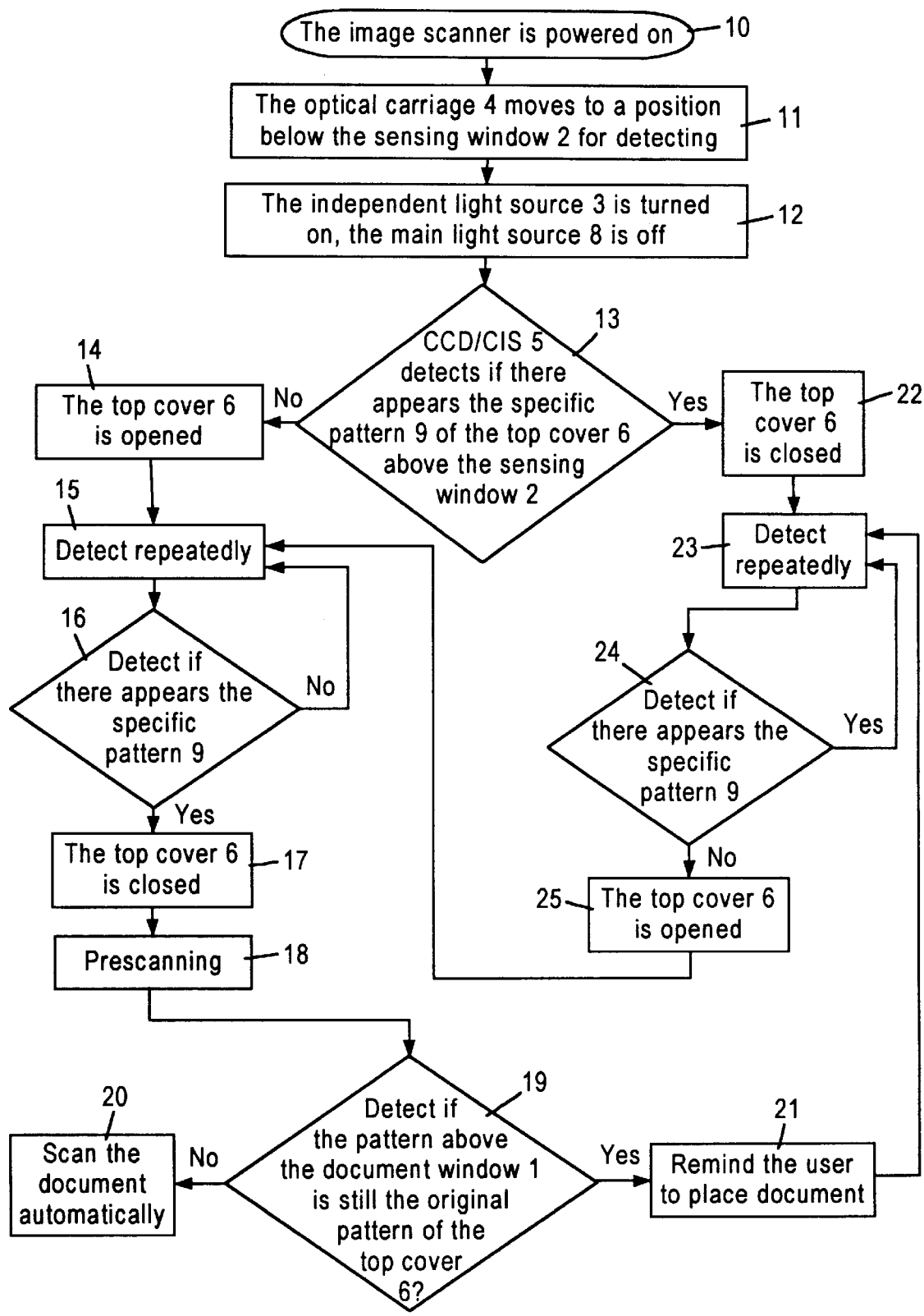
FIG. 4 is a flow chart showing the automatic initiating actions of the image scanner according to the present invention.

Please refer to FIG. 4, which is a flow chart showing the automatic initiating actions of the image scanner according to the present invention. After the image scanner is powered on (step 10), the optical carriage 4 will move to a position below the sensing window 2 for detecting by means of CCD/CIS 5(step 11), and then the independent light source 3 additionally provided will be turned on, the main light source 8 is off (step 12). The CCD/CIS 5 on optical carriage 4 begins to detect if there appears the specific pattern 9 of the corresponding portion on top cover 6 by means of the light of the independent light source 3 via the sensing window 2 (step 13). If the specific pattern 9 of the corresponding portion on top cover 6 does not appear, the image scanner will judge that the top cover 6 is opened (step 14), and then detect repeatedly if there appears the specific pattern 9 of the corresponding portion on top cover 6 (steps 15, 16). If no variation, then still detect repeatedly. If there appears the specific pattern 9 of the corresponding portion on top cover 6, the image scanner will judge that the top cover 6 is closed (step 17), a prescanning will be performed (step 18). After prescanning, if it is found that the pattern above the document window 1 is still the original pattern (not pattern 9) of the top cover 6 (step 19), i.e. no paper is placed on the document window 1, the image scanner will remind the user to place document (step 21), and then go to step 23; if it is found that the pattern above the document window 1 as not the original pattern of the top cover 6, the image scanner will scan the document automatically (step 20).

In step 13, if it is found that there appears the specific pattern 9 of the corresponding portion on top cover 6, the image scanner will judge that the top cover 6 is closed (step 22), and then detect repeatedly (steps 23, 24). If it is still the specific pattern 9 of the corresponding portion on top cover 6, then still repeat detecting; if there is no specific pattern 9 of the corresponding portion on top cover 6, the image scanner will judge that the top cover 6 is opened (step 25), and then go to step 15 to detect if the top cover is closed again.

Figure 5:
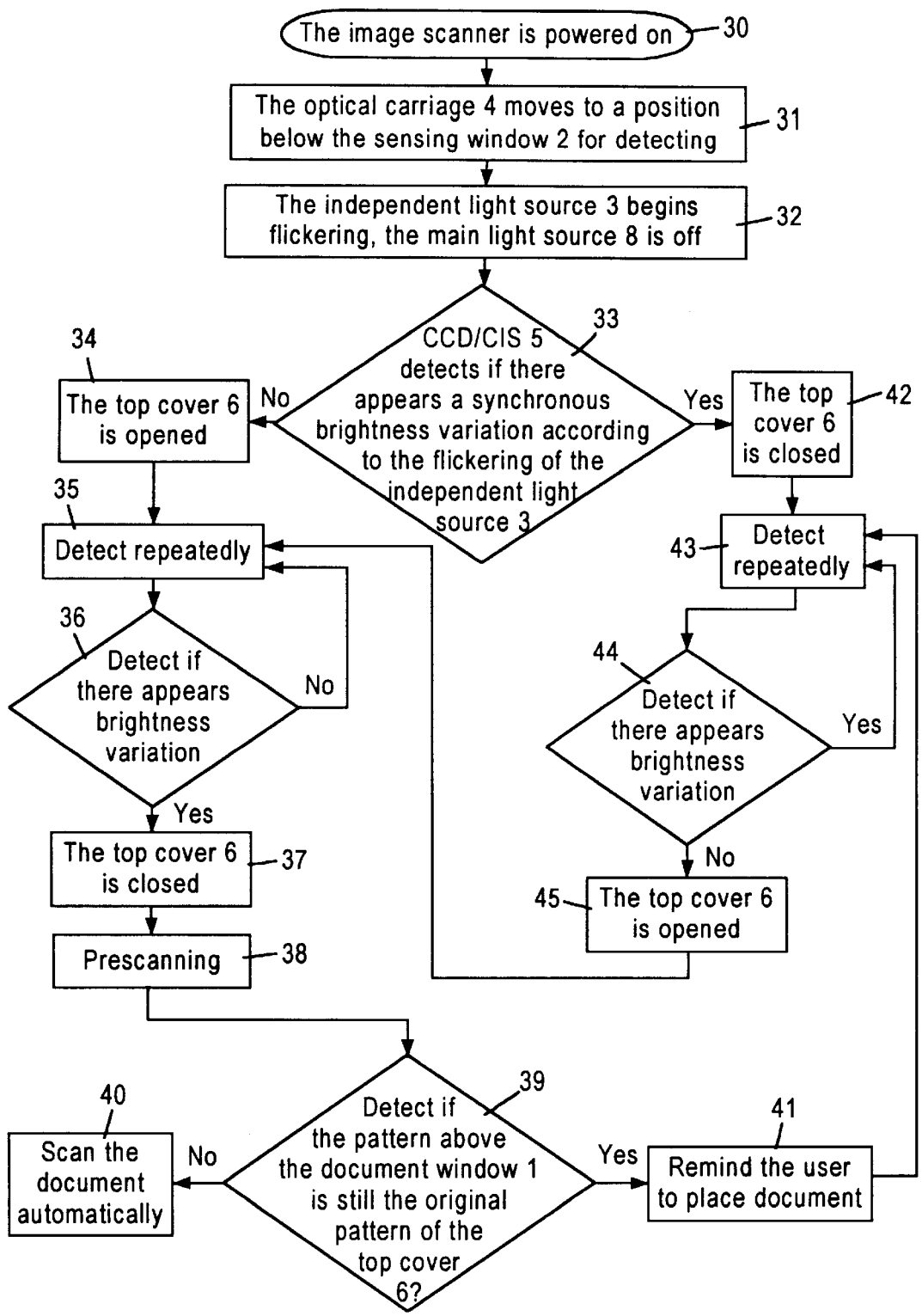
FIG. 5 is a flow chart showing another automatic initiating actions of the image scanner according to the present invention.

Please refer to FIG. 5, which is a flow chart showing another automatic initiating actions of the image scanner according to the present invention. After the image scanner is powered on (step 30), the optical carriage 4 will move to a position below the sensing window 2 for detecting by means of CCD/CIS 5 (step 31), and then the independent light source 3 additionally provided will be flickering, the main light source 8 is off (step 32). The CCD/CIS 5 on optical carriage 4 begins to detect if there appears a synchronous brightness variation according to the flickering of the independent light source 3 by means of the light of the independent light source 3 via the sensing window 2 (step 33). If no brightness variation, the image scanner will judge that the top cover 6 is opened (step 34), and then detect repeatedly if there appears brightness variation (steps 35, 36). If no variation, then still detect repeatedly. If there appears the brightness variation, the image scanner will judge that the top cover 6 is closed (step 37), a prescanning will be performed (step 38). After prescanning, if it is found that the pattern above the document window 1 is still the original pattern (not pattern 9) of the top cover 6 (step 39), i.e. no paper is placed on the document window 1, the image scanner will remind the user to place document (step 41), and then go to step 43; if it is found that the pattern above the document window 1 is not the original pattern of the top cover 6, the image scanner will scan the document automatically (step 40).

In step 33, if it is found that there appears the brightness variation, the image scanner will judge that the top cover 6 is closed (step 42), and then detect repeatedly (steps 43, 44). If there still appears the brightness variation, then still detect repeatedly; if there is no brightness variation, the image scanner will judge that the top cover 6 is opened (step 45), and then go to step 35 to detect if the top cover is closed again.

The position of the sensing window 2 has to be in front of the start position 7 of the document window 1, and can contact with the document window 1 or not. The number of the sensing window can be greater than 1. The size of the sensing window has no special limitation but must be able to enable CCD/CIS 5 to detect the pattern 9 of the top cover. Only one independent light source 3 is required to be provided below one of the sensing windows 2, but more than one independent light source is also permitted.

Figure 6:
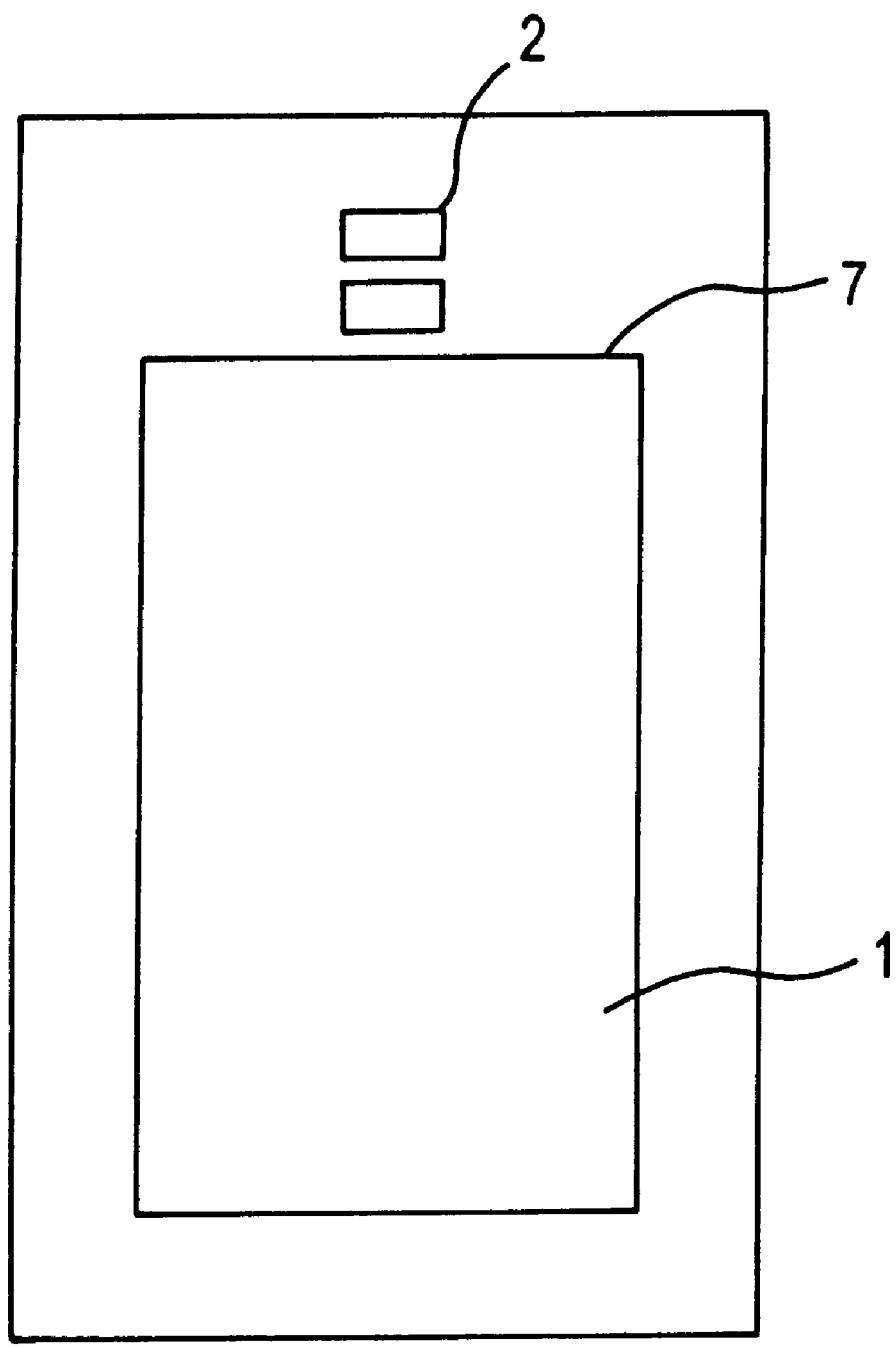
FIG. 6 is a schematic view of another type of sensing window of the image scanner according to the present invention.

Please refer to FIG. 6, the function of the sensing window 2 is to let the light emitted from the sources (main light source 8 and/or independent light source 3) to be projected on the top cover 6, and then reflected to be received by CCD/CIS 5, so the sensing window 2 can also be divided into two parts, as shown in the figure, wherein one part of the sensing window is used to pass the light emitted from the sources, while the other part of the sensing window is used to pass the reflected light to be received by CCD/CIS 5. This is another embodiment of the present invention.

The pattern 9 of the portion on top cover 6 corresponding to the sensing window 2 can not be all black, otherwise the, CCD/CIS 5 can not detect the pattern 9.

The main light source 8 and the independent light source 3 of the scanner should not operate simultaneously in order to avoid interference. The independent light source 3 should be turned off after the optical carriage 4 leaves the sensing window 2/start position 7 of the scanning. Only when the optical carriage 4 is below the sensing window 2, the detection action will be performed.

Although the present invention has included the sensing window 2 and the independent light source 3, the image scanner can still be designed into two modes, i.e. automatic scanning/manual scanning, to be selected by user.

Even though the independent light source 3 of the present invention can be lighted on continually (FIG. 4) or be flickering (FIG. 5) to perform detecting, the present invention can also be designed to combine both, i.e. when the independent light source 3 is flickering, the CCD/CIS 5 still detect the pattern 9 of the corresponding portion on top cover 6 to make sure that the detection is absolutely correct.

It is no doubt that after reading the above descriptions any skillful person in the art can create many different variations without departing the spirit and scope of the accompanying claims. Therefore, it is intended that the appended claims will cover all those variations.

I claim:

1. An image scanner with a function of initiating scanning automatically, wherein a sensing window is provided in front of a scanning start position of a document window of said image scanner, and an additional independent light source is provided below said sensing window, thereby to cooperate with CCD/CIS (charge-coupled device/contact image sensor) on the optical carriage of said image scanner to detect the open/close status of a top cover of said image scanner, a specific pattern of the portion of said top cover corresponding to said sensing window can not be all black, so as to determine to automatically initiate scanning of said image scanner or not.

2. The image scanner according to claim 1, wherein when said optical carriage of said image scanner moves to a position below said sensing window, said independent light source is turned on, so said CCD/CIS on said optical carriage can detect said specific pattern of the portion of said top cover corresponding to said sensing window, so as to determine to automatically initiate scanning of said image scanner or not, and when said optical carriage leaves said sensing window, said independent light source as turned off automatically.

3. The image scanner according to claim 1, wherein when said optical carriage of said image scanner moves to a position below said sensing window, said independent, light source will be flickering, so said CCD/CIS on said optical carriage can detect a brightness variation of the portion of said top cover corresponding to said sensing window, so as to determine to automatically initiate scanning of said image scanner or not, and when said optical carriage leaves said sensing window, said independent light source is turned off automatically.

4. The image scanner according to claim 3, wherein when said optical carriage of said image scanner moves to said position below said sensing window, said independent light source will be flickering, so said CCD/CIS on said optical carriage can detect a brightness variation of a portion of said top cover corresponding to said sensing window, while said CCD/CIS on said optical carriage will detect said specific pattern of the portion of said top cover corresponding to said sensing window as said independent light source is lighted on, so as to determine to automatically initiate scanning of said image scanner or not, and when said optical carriage leaves said sensing window, said independent light source is turned off automatically.

5. The image scanner according to claim 1, wherein said independent light source is LED.

6. The image scanner according to claim 1, wherein the number of said sensing window can be greater than 1, the size and position of said sensing window should be able to pass the light emitted from said independent light source and the reflected light thereof for said CCD/CIS to detect, and the number of said independent light source can also be greater than 1.

* * * * *